United States Patent
Okada et al.

[11] Patent Number: 5,917,681
[45] Date of Patent: Jun. 29, 1999

[54] THIN FILM MAGNETIC HEAD AND METHOD OF MANUFACTURING THE SAME AND MAGNETIC MEMORY APPARATUS

[75] Inventors: Mithumasa Okada; Takamitsu Orimoto; Keita Ohtsuka, all of Kanagawa, Japan

[73] Assignee: Fujitsu Limited, Kawasaki, Japan

[21] Appl. No.: 08/684,421

[22] Filed: Jul. 19, 1996

[30] Foreign Application Priority Data

Oct. 30, 1995 [JP] Japan .................................. 7-282138

[51] Int. Cl.⁶ ........................................ G11B 5/33
[52] U.S. Cl. .................... 360/113; 428/327; 428/328
[58] Field of Search ............... 360/113; 428/328, 428/327

[56] References Cited

U.S. PATENT DOCUMENTS

| | | | |
|---|---|---|---|
| 5,326,429 | 7/1994 | Cohen et al. | 156/655 |
| 5,327,313 | 7/1994 | Nishioka | 360/113 |
| 5,350,629 | 9/1994 | Chaug | 428/336 |
| 5,491,600 | 2/1996 | Chen | 360/113 |
| 5,508,881 | 4/1996 | Stevens | 361/305 |
| 5,591,408 | 1/1997 | Weisman | 216/13 |

FOREIGN PATENT DOCUMENTS 6-203326  7/1994  Japan .

OTHER PUBLICATIONS

Wolf et al "Silicon processing for the vlsi era" Lattice press, pp. 408–409, 1986.

*Primary Examiner*—Ceila Chang
*Attorney, Agent, or Firm*—Greer, Burns & Crain, Ltd.

[57] ABSTRACT

According to a method of manufacturing a thin film magnetic head, a magnetoresistive device and an alumina layer are formed on a substrate, then the alumina layer is covered with a covering layer made of metal such as Ti having a thickness of more than 10 nm, then a photoresist film is formed on the covering layer, and then an opening is formed by exposing and developing the photoresist film. In turn, a magnetic metal film is formed on an allover surface, then the photoresist film and the magnetic metal film thereon are removed. The thin film magnetic head structured as above may provide a good magnetic characteristic since it has the covering layer on the alumina layer to prevent the alumina layer from being corroded by liquid developer. In addition, a magnetic recording unit employing the thin film magnetic head may reproduce data recorded with high density.

4 Claims, 10 Drawing Sheets

THIN FILM MAGNETIC HEAD AND METHOD OF MANUFACTURING THE SAME AND MAGNETIC MEMORY APPARATUS

BACKGROUND OF THE INVENTION

1. Field of the Invention

The present invention relates to a method of manufacturing a thin film magnetic head and, more particularly, a thin film magnetic head wherein a magnetoresistive device is covered with an insulating nonmagnetic layer such as alumina and a pattern of a magnetic layer (shielding layer) is formed on the insulating nonmagnetic layer using a photolithography technique and a method of manufacturing the same and a magnetic memory apparatus including the same therein.

2. Description of the Prior Art

With the demand for high recording density of the magnetic memory apparatus in a computer, the thin film magnetic head has been used in recent years. The thin film magnetic head of this kind has been manufactured in virtue of photolithography technique. There are two types of thin film magnetic head; one is that read and write operations are performed by an inductive head (a head being made up of a core and coils) respectively, and the other is that a write operation is performed by the inductive head while a read operation is performed by the magnetoresistance head (MR head) including the magnetoresistive device (MR device). The magnetoresistive device has advantageous features that it has excellent magnetic sensitivity and that it can cope well with high recording density.

Figure 1:
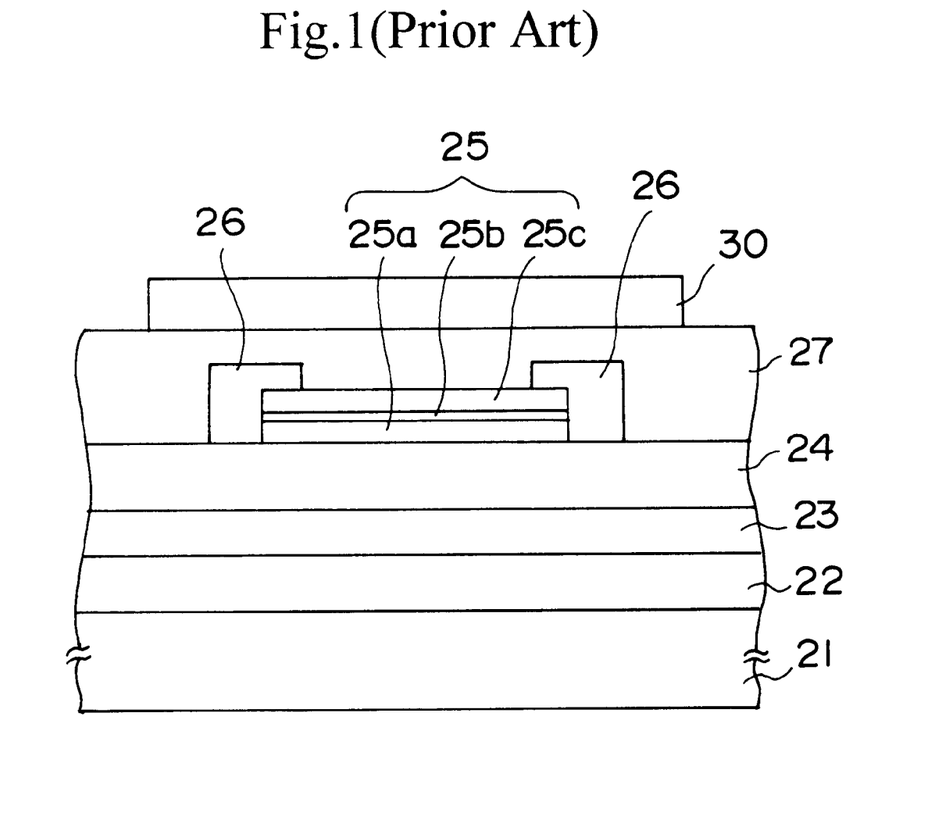
FIG. 1 is a sectional view showing a configuration of a ordinary thin film magnetic head.

For the purposes of example, the conventional thin film magnetic head including the magnetoresistive device is composed as shown in FIG. 1. The magnetic head consists of an AlTiC substrate 21; an alumina ($Al_2O_3$) layer 22, a lower shielding layer 23 and an alumina layer 24, which being stacked sequentially on the substrate 21 from the bottom; a SAL (Soft Adjacent Layer) 25a, a nonmagnetic layer 25b, and a magnetoresistance layer (referred to as an "MR layer" hereinafter) 25c, which constituting the magnetoresistive device 25 and being formed in sequence on the alumina layer 24; a pair of terminals 26 connected respectively to both ends of the magnetoresistive device 25; an alumina layer 27 for covering the magnetoresistive device 25 and the terminals 26; and an upper shielding layer 30 formed on the alumina layer 27 and in a region directly over the magnetoresistive device 25.

Figure 2A:
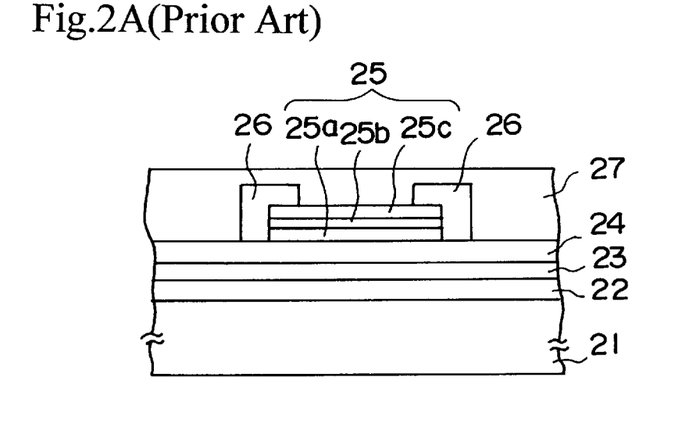
FIGS. 2A to 2C are sectional views showing manufacturing steps of the conventional ordinary thin film magnetic head.
Figure 2B:
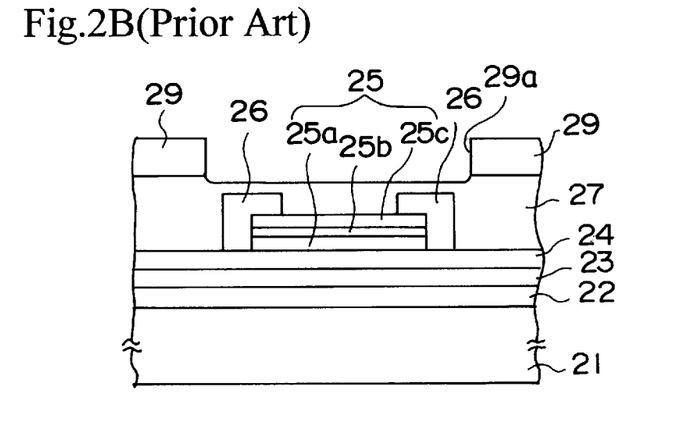
Figure 2C:
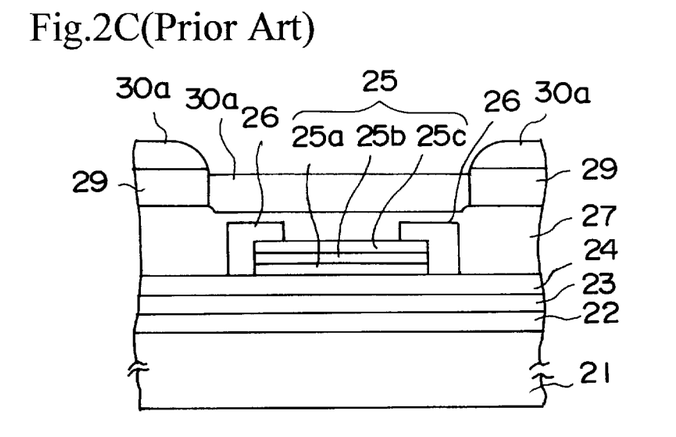

FIGS. 2A to 2C are sectional views showing a method of manufacturing the above conventional thin film magnetic head in order of the manufacturing steps.

First, as shown in FIG. 2A, the alumina layer 22 is formed on the AlTiC substrate 21 using a sputtering technique or ion beam sputtering technique, and the lower shielding layer 23 made up of magnetic metal is then formed on the alumina layer 22.

Then, the alumina layer 24 is formed on the lower shielding layer 23 using a sputtering technique or ion beam sputtering technique. Subsequently, the SAL 25a, the nonmagnetic layer 25b, and the MR layer 25c are formed on the alumina layer 24 in order. The magnetoresistive device 25 may then be finished by patterning these three layers 25a, 25b, 25c as a rectangular shape if they are viewed from the upper direction. Next, a metal film is formed all over the surface, and the terminals 26 are then formed on both end portions of the magnetoresistive device 25 by patterning the metal film. Thereafter, the alumina layer 27 is formed on the entirety of the resultant structure so as to cover the magnetoresistive device 25 and the terminals 26.

Next, as shown in FIG. 2B, a photoresist film 29 is formed on the alumina layer 27 using a spin coating technique. The photoresist film 29 located in a region of the alumina layer 27 just over the magnetoresistive device 25 is then removed via exposure and developing processes to thus form an opening 29a.

Then, as shown in FIG. 2C, a magnetic metal film 30a is formed all over surfaces of the resultant structure. The photoresist film 29 and the magnetic metal film 30a thereon are then removed so only the magnetic metal film 30a remains in a region over the magnetoresistive device 25. The remaining portion of the magnetic metal film 30a serves as the upper shielding layer 30. The thin film magnetic head shown in FIG. 1 has been derived in a fashion as described above.

Usually, a novolac resin containing a phenol is used as the principal ingredient of the photoresist, and a potassium hydroxide, a sodium hydroxide or a tetramethyl hydroxide is used as the principal ingredient of a liquid developer for the photoresist.

However, according to the foregoing conventional method of manufacturing the thin film magnetic head, the alumina layer 27 would be corroded by liquid developer when the pattern of the photoresist film is formed on the alumina layer 27. As a result, either a film thickness of the alumina layer 27 would be lessened or pin holes would be caused in the alumina layer 27. Therefore, insulation resistance and breakdown voltage performance of the alumina layer 27 would be in some cases deteriorated. In addition, magnetic anisotropy of the upper shielding layer 30 formed on the alumina layer 27 would become unstable because of deterioration in the surface state of the alumina layer 27 due to liquid developer. This would sometimes result in reduction in the magnetic characteristic of the alumina layer 27.

For this reason, there has been proposed in Patent Application Publication (KOKAI) 6-203326 that, in manufacturing steps of the inductive head, the alumina layer which is difficult to be eroded by alkali liquid developer should be formed by supplying a large bias electric power to the substrate when the alumina layer constituting the head gap is formed in virtue of bias sputtering technique. But it would be obvious that this alumina layer cannot prevent sufficiently reduction in the film thickness of the alumina layer and deterioration in the breakdown voltage performance thereof due to the liquid developer.

SUMMARY OF THE INVENTION

It is an object of the present invention to provide a thin film magnetic head capable of preventing an insulating nonmagnetic layer from being corroded by liquid developer upon forming a photoresist film on the insulating nonmagnetic layer such as alumina, and also preventing reduction in the film thickness of the insulating nonmagnetic layer and deterioration in breakdown voltage performance thereof and a method of manufacturing the same, and a magnetic recording unit including the same.

In the present invention, the covering layer made of metal is formed on the insulating nonmagnetic layer such as alumina. After this, the photoresist film is formed on the covering layer and is then exposed and developed.

Therefore, the insulating nonmagnetic layer does not contact with liquid developer upon developing photoresist because it is covered with the covering layer. As a result, reduction in thickness of the insulating nonmagnetic layer and generation of pin holes can be firmly prevented.

Any metal which cannot be corroded by liquid resist developer may be employed as the covering layer. More particularly, most metals (including their metal alloys) such as Ti (titanium), Ta (tantalum), Au (gold), Cu (copper), Fe (iron), Ni (nickel) and Co (cobalt), by way of example, are available. However, in order to prevent an influence on the magnetic characteristic of the magnetic layer to be formed on the covering layer, it is preferable that the covering film is made of nonmagnetic metal such as Ti or Ta. Further, in order to prevent firmly reduction in the film thickness of the insulating nonmagnetic layer and generation of pin holes therein due to liquid developer, it is preferable to form the covering layer so as to be more than 10 nm thick.

The thin film magnetic head formed as above has a structure including the covering layer made of metal on the insulating nonmagnetic layer, and thus can exhibit a good magnetic characteristic because deterioration in the insulation resistance and degradation in the breakdown voltage performance of the insulating nonmagnetic layer can be prevented.

In addition, the magnetic recording unit including the thin film magnetic head therein can reproduce data stored with high density because it has good magnetic characteristics.

DESCRIPTION OF THE PREFERRED EMBODIMENTS

There will be explained preferred embodiments of the present invention with reference to accompanying drawings hereinafter.

First Embodiment

FIGS. 3A to 3H are sectional views showing a method of manufacturing a thin film magnetic head according to a first embodiment of the present invention in order of manufacturing step.

Figure 3A:
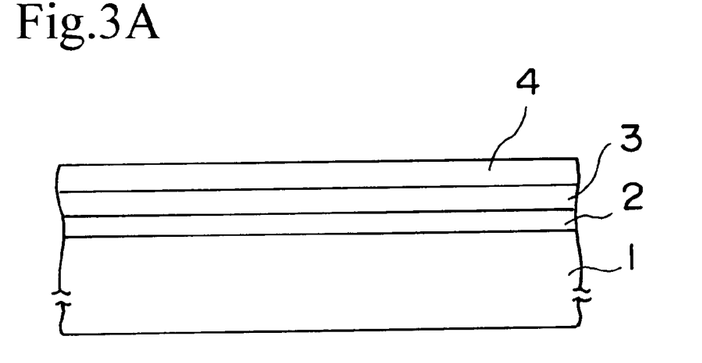
FIGS. 3A to 3H are sectional views showing manufacturing steps of a thin film magnetic head according to a first embodiment of the present invention in order of manufacturing step.

At first, as shown in FIG. 3A, an alumina is deposited on the AlTiC substrate 1 in virtue of sputtering technique or ion beam sputtering technique to form an alumina layer 2 in 1 to 30 μm thick. Magnetic metal such as permalloy or sendust is then deposited on the alumina layer 2 in virtue of sputtering technique to form a lower shielding layer (magnetic shielding layer) 3 having a 1 to 4 μm thickness.

After this, an alumina is deposited on the lower shielding layer 3 in virtue of sputtering technique or ion beam sputtering technique to form an alumina layer 4 having a 50 to 300 μm thickness.

Figure 3B:
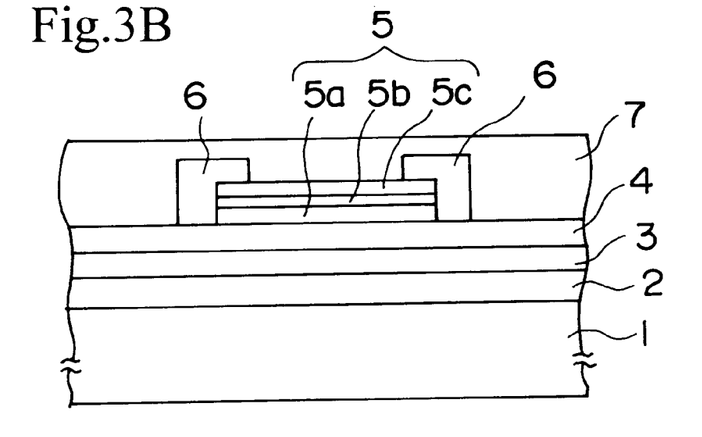

Next, as shown in FIG. 3B, a SAL 5a made of about 20 nm thick Ni-Fe system alloy, a nonmagnetic layer 5b made of about 10 nm thick Ta, and an MR layer 5c made of about 20 nm thick Ni-Fe system alloy are sequentially formed on the alumina layer 4. A magnetoresistive device 5 may be achieved by patterning a stacked structure formed of three layers 5a, 5b, 5c in virtue of photolithgraphy to form a rectangular shape if it is viewed from the upper direction. Subsequently, a metal film is formed on an entire surface of the resultant structure, and then a pair of terminals 6 are formed on both ends of the magnetoresistive device 5 by patterning the metal film in virtue of photolithography. An alumina is deposited over an entirety of the resultant structure in virtue of sputtering technique or ion beam sputtering technique so as to cover the magnetoresistive device 5 and the terminals 6. An alumina layer 7 is thus formed to have a thickness of 50 to 300 nm.

Figure 3C:
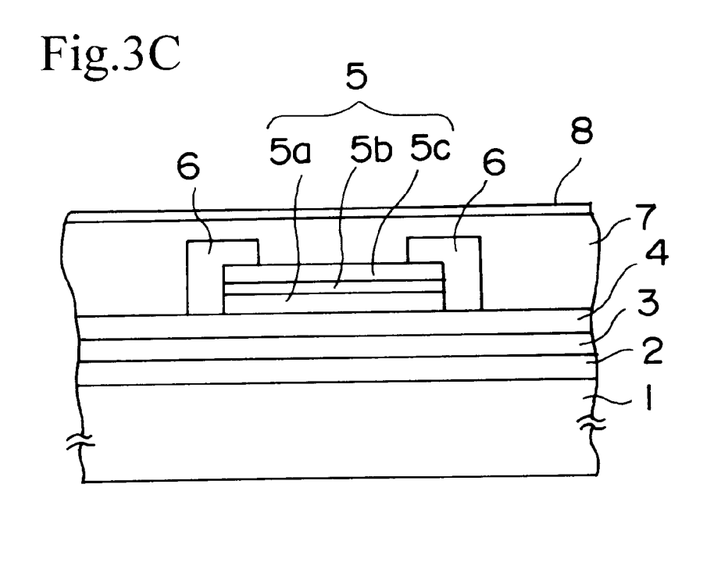

Next, as shown in FIG. 3C, a covering layer 8 made of Ti is formed on the alumina layer 7 in virtue of sputtering technique or ion beam sputtering technique to have a thickness 10 to 100 nm.

Figure 3D:
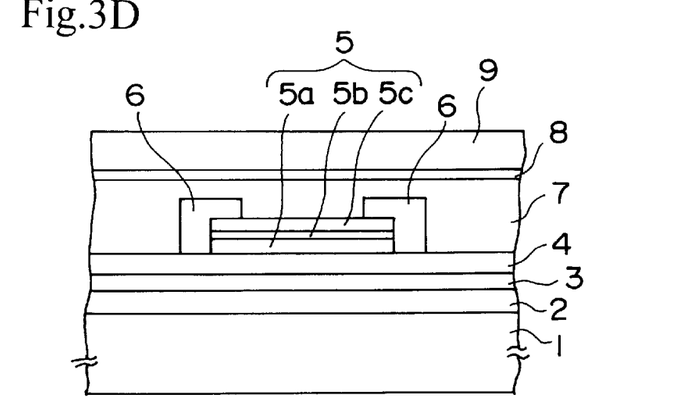

Thereafter, as shown in FIG. 3D, a photoresist film 9 is formed by coating a photoresist on the covering layer 8 by an ordinary method (for instance, spin coating method, etc.). Only a portion of the photoresist film 9 located in a region directly over the magnetoresistive device 5 is exposed.

Figure 3E:
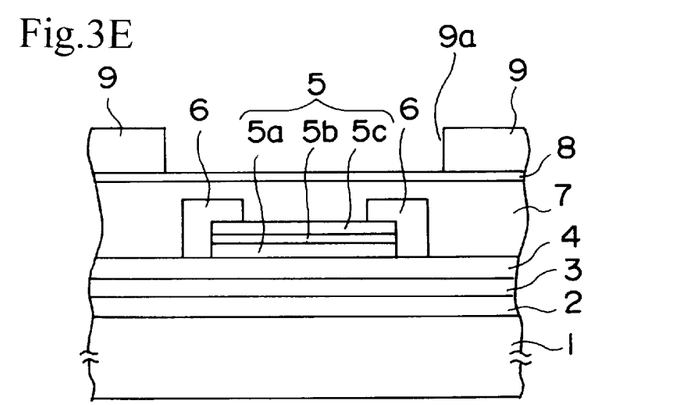

Then, as shown in FIG. 3E, the photoresist film 9 is subjected to developing process so as to remove the exposed portion, thus resulting in an opening portion 9a in the photoresist film 9. At this time, the alumina layer 7 is in no way corroded by liquid developer since it is covered with the covering layer 8.

Figure 3F:
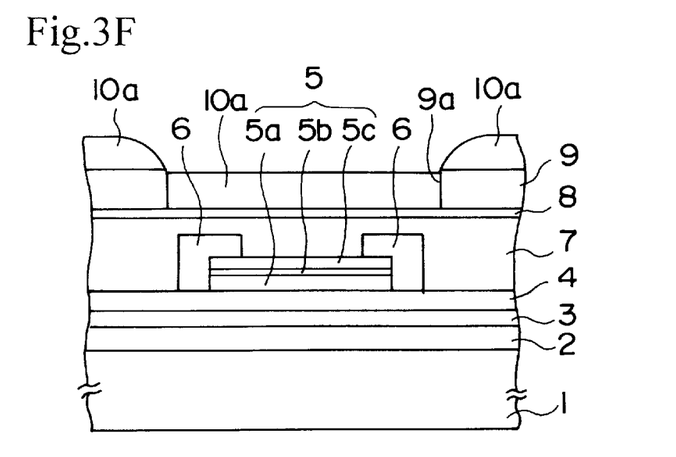
Figure 3G:
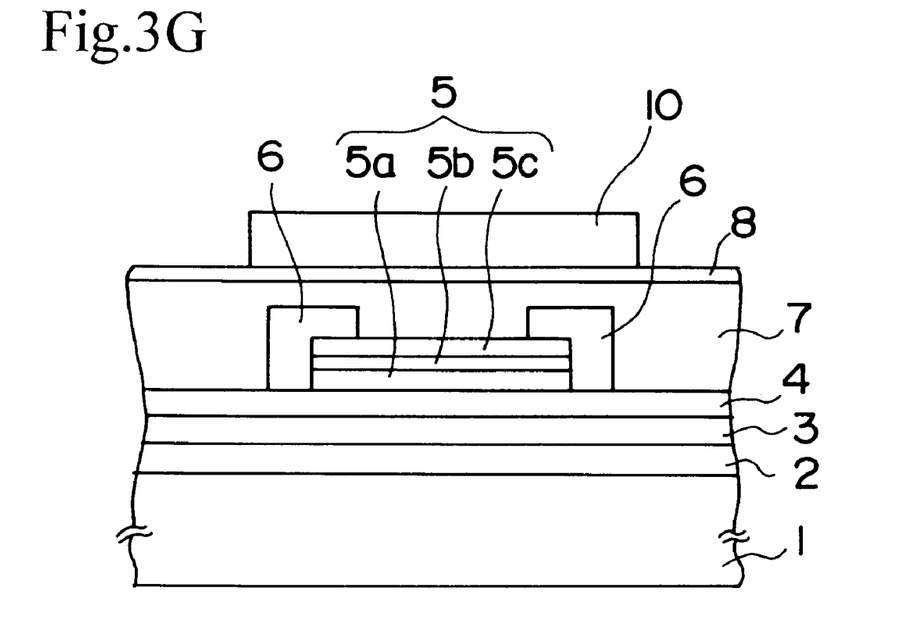

In turn, as shown in FIG. 3F, a film 10a made of magnetic metal such as permalloy or sendust is formed on allover surface of the resultant structure to be several μm thick in virtue of sputtering technique or ion beam sputtering technique. Then, the resist film 9 together with the magnetic metal film 10a thereon are removed to thus remain the magnetic metal film 10a only in a region just over the magnetoresistive device 5. As shown in FIG. 3G, this remaining magnetic metal film 10a may serve as an upper shielding layer (magnetic shielding layer) 10.

Figure 3H:
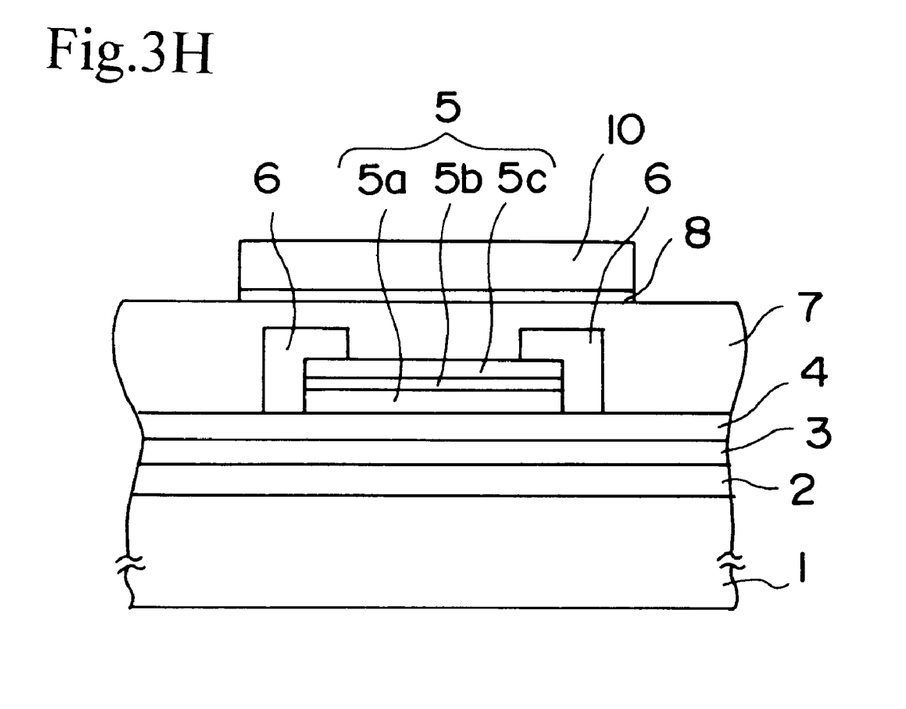

Subsequently, as shown in FIG. 3H, after an etching mask (not shown) is formed on the upper shielding layer 10, the covering layer 8 is etched to be left only in a region beneath the upper shielding layer 10. The etching mask is then removed. With the above structure, a thin film magnetic head has been completed.

In the first embodiment, since the alumina layer 7 is covered with the covering layer 8 made of Ti during the photolithography step to form the upper shielding layer 10, the alumina layer 7 is never directly contacted with liquid developer. Accordingly, it can be surely prevented that a thickness of the alumina layer 7 would be reduced due to liquid developer and that pin holes would be caused in the alumina layer 7. As a result, deterioration in an insulating characteristic of the alumina layer 7 and reduction in a breakdown voltage characteristic thereof can be prevented and in addition the shielding layer 10 can be formed on the covering layer 8 with a good surface condition. Hence, such an advantage can be attained that degradation in magnetic anisotropy of the shielding layer 10 and reduction in a magnetic characteristic thereof can be prevented.

In order to avoid an influence upon the magnetic characteristic of the lower shielding layer 3 or the upper shielding layer 10, it is preferable that, as described above, the covering layer 8 would be made of nonmagnetic metal such as Ti or Ta. However, a metal constituting the covering layer 8 may not be restricted to nonmagnetic metal but may be constituted with magnetic metal. In addition, in order to surely prevent erosion of the alumina layer 7 due to liquid developer, it is desired that the covering layer 8 would be formed to be more than 10 nm thick. However, if the covering layer 8 is formed excessively thick, a distance between the lower shielding layer 3 and the upper shielding layer 10 becomes too large, thereby reducing the magnetic characteristic. A distance between the lower shielding layer 3 and the upper shielding layer 10 is at least 0.1 μm and at most 1.0 μm.

The test results of the breakdown voltage characteristic of the thin film magnetic head of the present invention will be explained hereinafter while comparing the comparative example with the first embodiment of the present invention.

Figure 4:
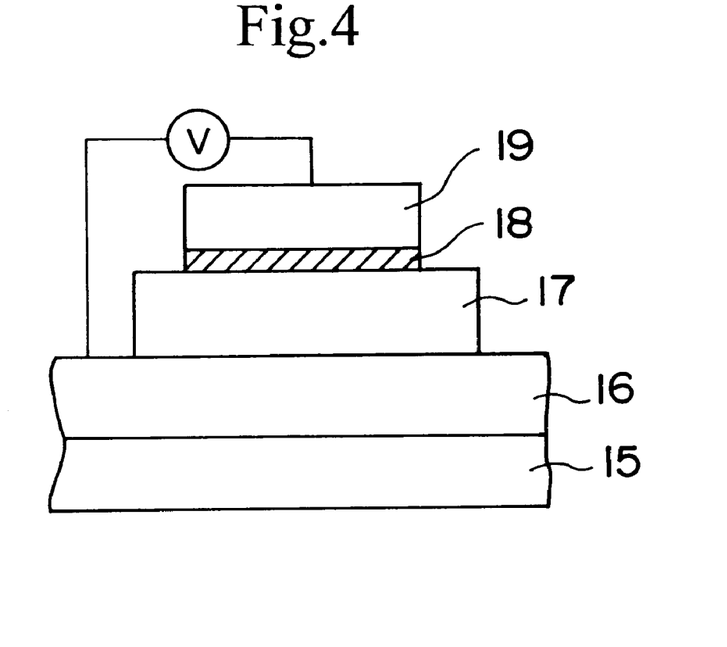
FIG. 4 is a sectional view showing a sample used to examine a breakdown voltage characteristic of the thin film magnetic head according to the first embodiment of the present invention.

Samples are prepared as the embodiment of the present invention wherein, as shown in FIG. 4, a NiFe layer 16 is formed on a substrate 15 and an alumina layer 17 is formed on the NiFe layer 16 to be about 80 nm or about 100 nm thick. A covering layer 18 made of Ti is then formed on the alumina layer 17 to have a thickness of 10 nm, and then a NiFe layer 19 is patterned on the covering layer 18 by virtue of photolithgraphy.

With respect to the plural samples wherein the NiFe layer 19 is patterned on the alumina layer 17 in virtue of photolithgraphy as above, a breakdown voltage of the alumina layer 17 has been examined by applying a voltage between the NiFe layers 16 and 19 until destruction of the alumina layer 17 is brought into.

Figure 5:
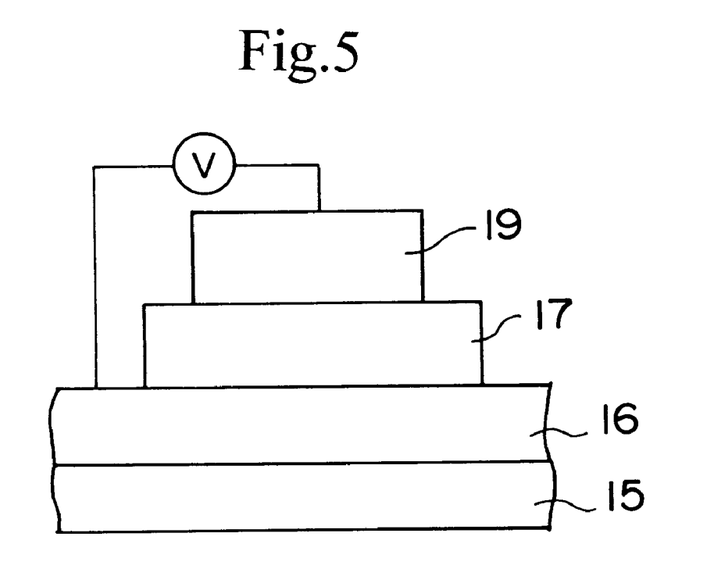
FIG. 5 is a sectional view showing another sample used to examine a breakdown voltage characteristic of the thin film magnetic head according to the comparative example.

On the contrary, another sample which are similar to the samples of the above embodiment except that the covering layer 18 is not formed, as shown in FIG. 5, are prepared as the comparative example. With respect to the samples of the comparative example, a breakdown voltage of the alumina layer 17 has been examined in the same manner as the above embodiment.

Figure 6:
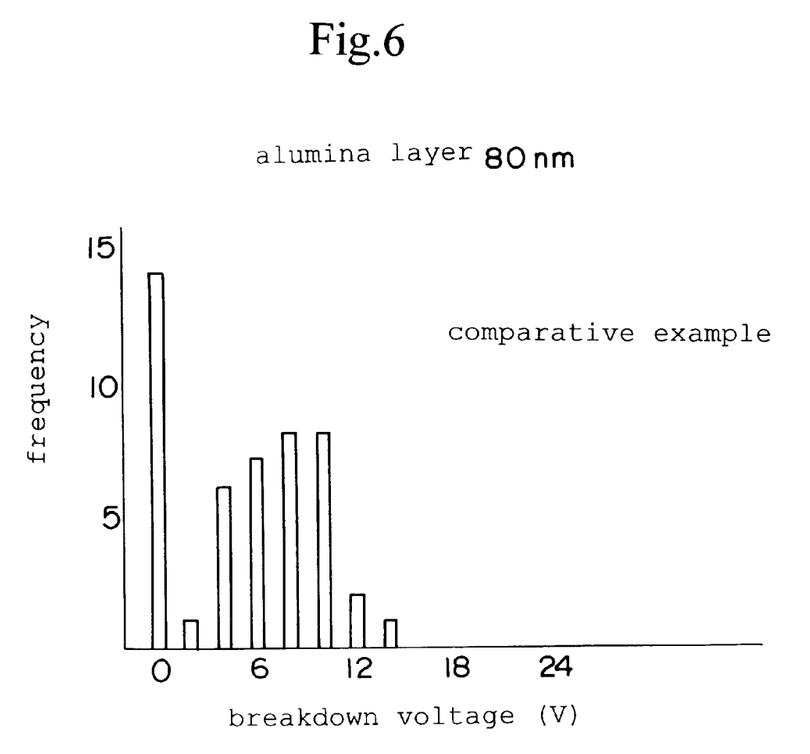
FIG. 6 is a graph illustrating the result of the breakdown voltage of the sample having a 80 nm thick alumina layer according to the comparative example.
Figure 7:
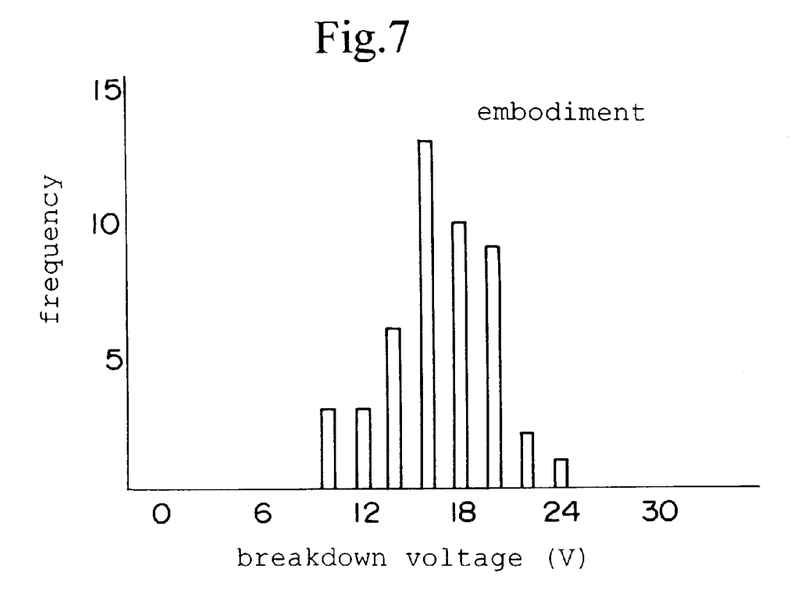
FIG. 7 is a graph illustrating the result of the breakdown voltage of the sample having a 80 nm thick alumina layer according to the first embodiment of the present invention.

FIGS. 6 and 7 are graphs respectively illustrating the results of the breakdown voltage of the samples, each having a 80 nm thick alumina layer, of the comparative example and the first embodiment of the present invention. In the graphs, a breakdown voltage is plotted on the lateral axis and frequency on the vertical axis.

Figure 8:
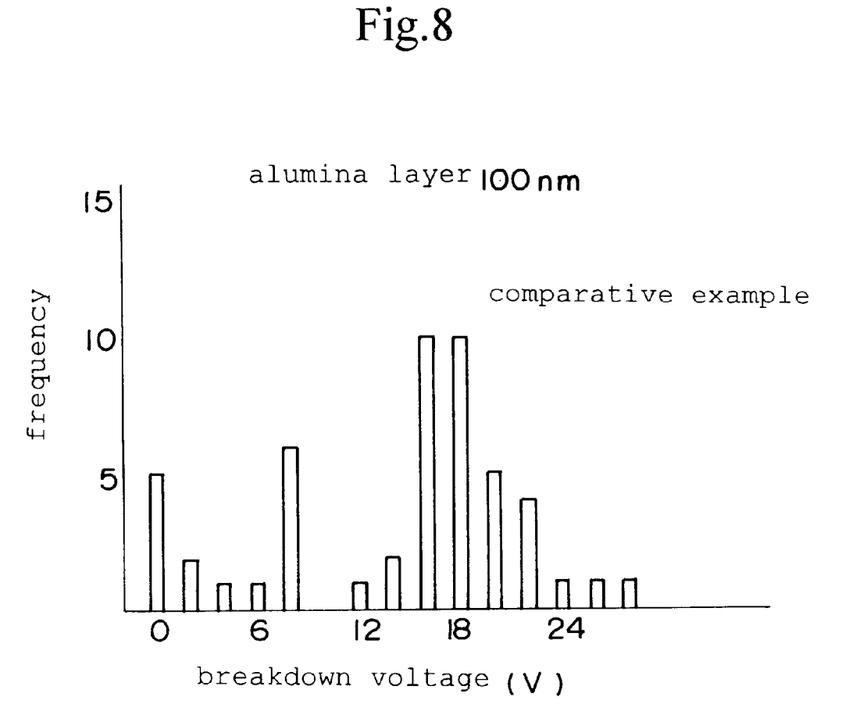
FIG. 8 is a graph illustrating the result of the breakdown voltage of the sample having a 100 nm thick alumina layer according to the comparative example.
Figure 9:
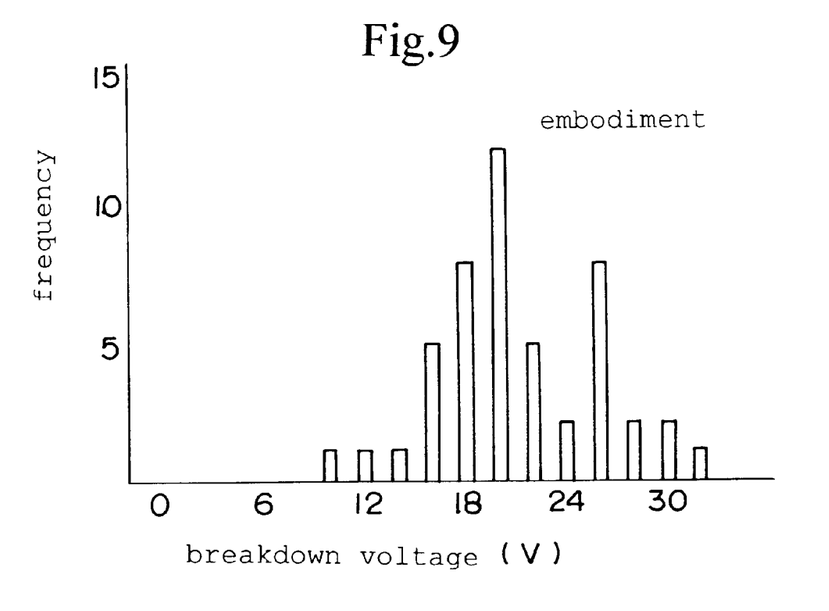
FIG. 9 is a graph illustrating the result of the breakdown voltage of the sample having a 100 nm thick alumina layer according to the first embodiment of the present invention.

FIGS. 8 and 9 are graphs respectively illustrating the results of the breakdown voltage of the samples, each having a 100 nm thick alumina layer, of the comparative example and the first embodiment of the present invention. In the graphs, a breakdown voltage is also plotted on the lateral axis and frequency on the vertical axis.

The results of calculated average values of the breakdown voltages in the samples of the comparative example and the first embodiment of the present invention are given in the following table.

TABLE

|  | Alumina Layer (80 nm thick) | Alumina Layer (100 nm thick) |
| --- | --- | --- |
| Comparative Example (without Ti film) | 5.3 V | 14.6 V |
| Embodiment (with Ti film) | 16.7 V | 21.1 V |

As evident from FIGS. 6 to 9 and the above TABLE, the samples according to the present invention may achieve an extremely good breakdown voltage performance in contrast to the samples according to the comparative example.

A giant MR device or an MR device having a spin valve structure may be used as the MR device of the first embodiment.

Second Embodiment

Figure 10:
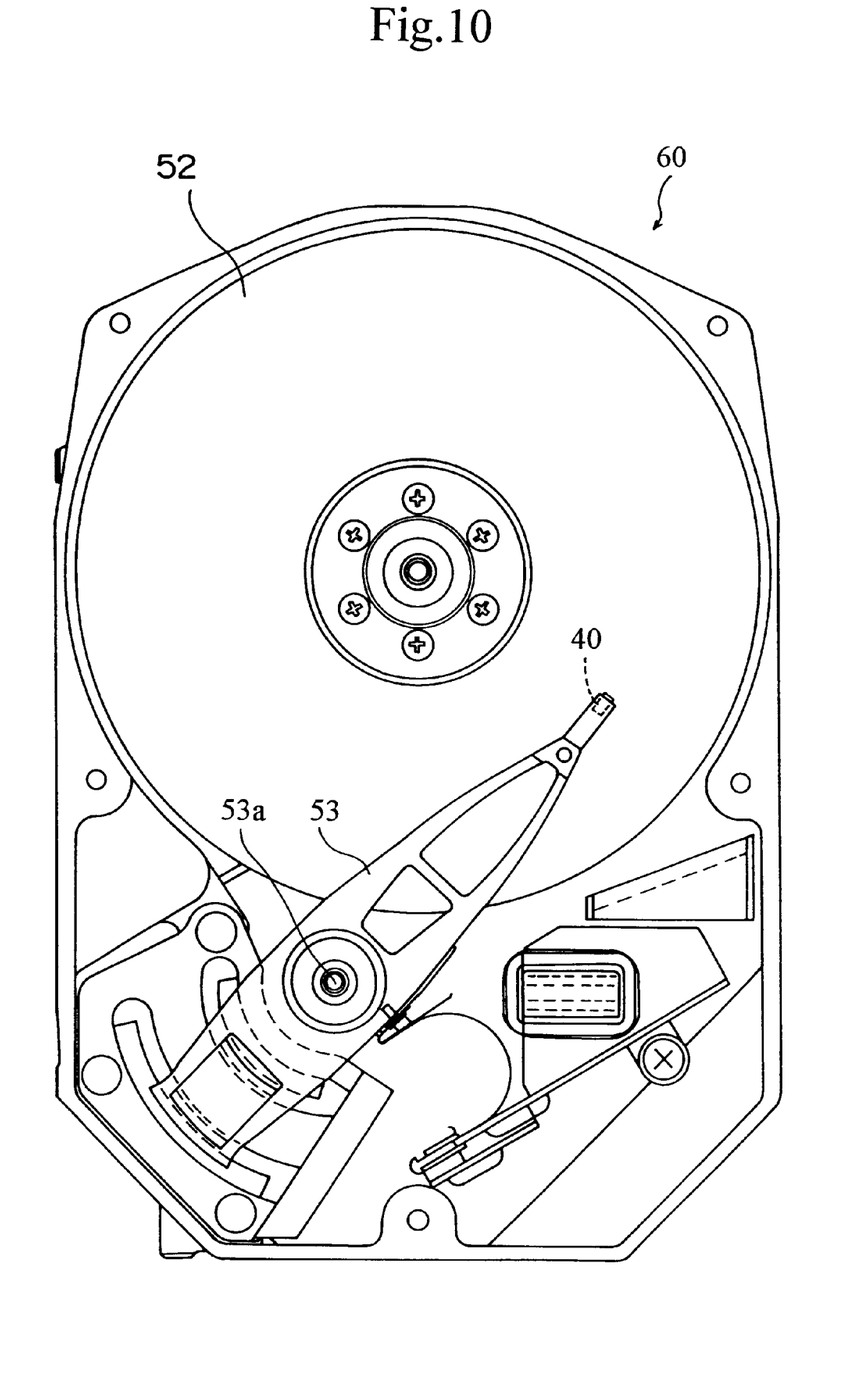
FIG. 10 is a plan view showing a magnetic recording unit according to a second embodiment of the present invention.
Figure 11:
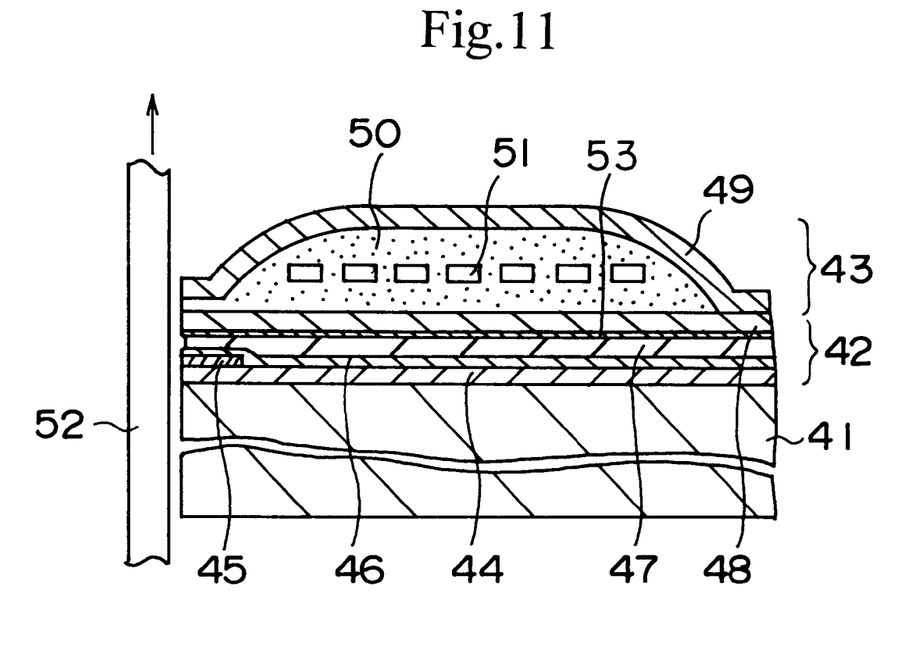
FIG. 11 is a sectional view showing a magnetic head of the magnetic recording unit according to the present invention.

FIG. 10 is a plan view showing a magnetic recording unit including the above thin film magnetic head. FIG. 11 is a sectional view showing the magnetic head of the magnetic recording unit in FIG. 10.

A magnetic recording unit 60 comprises mainly a magnetic recording medium 52 rotated by a motor (not shown) at high speed, an arm 53 rotated around a fulcrum 53a, and a magnetic head 40 attached to tip of the arm 53.

As shown in FIG. 11, the magnetic head 40 is made up of a reproducing head 42 and a recording head 43, both being arranged adjacently on a substrate 41.

The reproducing head 42 having the structure described above may be adopted. More particularly, the reproducing head 42 consists of a lower shielding layer 44 formed on the substrate 41 via an alumina layer (not shown), a magnetoresistive device 45 formed on the lower shielding layer 44 via the alumina layer (not shown), a leading electrode (lead terminal) 46 extended from the magnetoresistive device 45, an alumina layer 47 for covering the magnetoresistive device 45 and the leading electrode 46, and an upper shielding layer 48 formed on the alumina layer 47 via the covering layer 53.

On the other hand, the recording head 43 comprises a coil 51 which is formed between the upper shielding layer 48 and a third shielding layer 49 via an insulating layer 50.

The magnetic shielding layers 44, 48, 50 are formed of soft magnetic substance respectively. Gaps (clearances) are provided between respective ends of these magnetic shielding layers opposing to the surface of the magnetic recording medium 52 and the magnetic recording medium 52.

What is claimed is:

1. A thin film magnetic head, comprising;

a magnetoresistive device formed above a substrate;

an insulating nonmagnetic layer for covering said magnetoresistive device;

an erosion prevention layer made of metal and covering said insulating nonmagnetic layer for preventing erosion of said insulating nonmagnetic layer caused by a photoresist and a photoresist developing liquid; and a first shielding layer made of a magnetic metal, formed on said erosion prevention layer by patterning with said photoresist and said photoresist developing liquid;

wherein said erosion prevention layer is made of nonmagnetic metal selected from the group of Ti and Ta.

2. A thin film magnetic head according to claim 1, wherein said insulating nonmagnetic layer is made of alumina.

3. A thin film magnetic head according to claim 1, wherein said erosion prevention layer is formed to have a thickness at least 10 nm.

4. The thin film magnetic head according to claim 1, wherein said photoresist is a novolac resin containing phenol as a primary component; and said photoresist developing liquid further contains as a primary component at least one from the group consisting of a potassium hydroxide, a sodium hydroxide, and a tetramethyl hydroxide.

* * * * *